US009263741B2

(12) United States Patent
Iriyama et al.

(10) Patent No.: US 9,263,741 B2
(45) Date of Patent: Feb. 16, 2016

(54) NEGATIVE ELECTRODE FOR NANAQUEOUS ELECTROLYTE SECONDARY BATTERY, NONAQUEOUS ELECTROLYTE SECONDARY BATTERY USING THE SAME, AND METHOD FOR MANUFACTURING NEGATIVE ELECTRODE FOR NONAQUEOUS ELECTROLYTE SECONDARY BATTERY

(75) Inventors: Jiro Iriyama, Kanagawa (JP); Ryuichi Kasahara, Kanagawa (JP); Tetsuya Kajita, Kanagawa (JP); Tatsuji Numata, Kanagawa (JP)

(73) Assignee: NEC Energy Devices, Ltd., Kanagawa (JP)

( * ) Notice: Subject to any disclaimer, the term of this patent is extended or adjusted under 35 U.S.C. 154(b) by 753 days.

(21) Appl. No.: 13/132,549

(22) PCT Filed: Dec. 17, 2009

(86) PCT No.: PCT/JP2009/071024
§ 371 (c)(1),
(2), (4) Date: Jun. 2, 2011

(87) PCT Pub. No.: WO2010/071166
PCT Pub. Date: Jun. 24, 2010

(65) Prior Publication Data
US 2011/0244328 A1   Oct. 6, 2011

(30) Foreign Application Priority Data
Dec. 19, 2008 (JP) .................................. 2008-323504

(51) Int. Cl.
*H01M 4/131* (2010.01)
*H01M 4/134* (2010.01)
*H01M 4/1391* (2010.01)
*H01M 4/1395* (2010.01)
(Continued)

(52) U.S. Cl.
CPC ............ *H01M 4/386* (2013.01); *H01M 4/0461* (2013.01); *H01M 4/0471* (2013.01);
(Continued)

(58) Field of Classification Search
CPC .... H01M 4/134; H01M 4/1395; H01M 4/386
USPC ........... 429/218.1, 231.95; 204/59; 252/182.1
See application file for complete search history.

(56) References Cited

U.S. PATENT DOCUMENTS

| 5,395,711 A | 3/1995 | Tahara et al. |
| 2007/0031733 A1 | 2/2007 | Kogetsu et al. |

(Continued)

FOREIGN PATENT DOCUMENTS

| CN | 1967910 A | 5/2007 |
| JP | 6-325765 A | 11/1994 |

(Continued)

*Primary Examiner* — Barbara Gilliam
*Assistant Examiner* — Stephan Essex
(74) *Attorney, Agent, or Firm* — Foley & Lardner LLP

(57) ABSTRACT

There is provided a negative electrode for a nonaqueous electrolyte secondary battery in which when a battery is formed, the energy density is high, and moreover, the decrease in charge and discharge capacity is small even if charge and discharge are repeated. By using silicon oxide particles having a particle diameter in a particular range as a starting raw material, and heating these particles in the range of 850° C. to 1050° C., Si microcrystals are deposited on the surfaces of the particles. Then, by performing doping of Li, a structure comprising a plurality of protrusions having height and cross-sectional area in a particular range is formed on the surfaces. The average value of the height of the above protrusions is 2% to 19% of the average particle diameter of the above lithium-containing silicon oxide particles. By using the lithium-containing silicon oxide particles obtained by the above means as a negative electrode active material, a negative electrode for a nonaqueous electrolyte secondary battery is fabricated.

13 Claims, 3 Drawing Sheets

(51) Int. Cl.
*H01M 4/38* (2006.01)
*H01M 10/052* (2010.01)
*H01M 4/04* (2006.01)
*H01M 4/48* (2010.01)
*H01M 4/02* (2006.01)

(52) U.S. Cl.
CPC ............ *H01M4/134* (2013.01); *H01M 4/1395* (2013.01); *H01M 4/483* (2013.01); *H01M 10/052* (2013.01); *H01M 2004/027* (2013.01); *Y02E 60/122* (2013.01); *Y02T 10/7011* (2013.01); *Y10T 29/49108* (2015.01); *Y10T 29/49115* (2015.01)

(56) References Cited

U.S. PATENT DOCUMENTS

| | | |
|---|---|---|
| 2007/0111102 A1 | 5/2007 | Inoue et al. |
| 2007/0224508 A1 | 9/2007 | Aramata et al. |
| 2008/0199780 A1* | 8/2008 | Hayata et al. ............ 429/231.95 |
| 2009/0004568 A1 | 1/2009 | Hirose et al. |
| 2010/0112451 A1* | 5/2010 | Shibutani et al. ........ 429/231.95 |
| 2010/0129718 A1* | 5/2010 | Higuchi et al. .......... 429/231.95 |

FOREIGN PATENT DOCUMENTS

| | | |
|---|---|---|
| JP | 11-250896 | 9/1999 |
| JP | 2003-303586 A | 10/2003 |
| JP | 2006-100244 A | 4/2006 |
| JP | 2006-269216 A | 10/2006 |
| JP | 2007-294423 A | 11/2007 |
| JP | 2008186732 A * | 8/2008 |
| JP | 2008-293872 A | 12/2008 |
| WO | WO 97/01193 A1 | 1/1997 |
| WO | WO 2008/044683 A1 | 4/2008 |
| WO | WO 2008044683 A1 * | 4/2008 |

* cited by examiner

5 μm

NEGATIVE ELECTRODE FOR NANAQUEOUS ELECTROLYTE SECONDARY BATTERY, NONAQUEOUS ELECTROLYTE SECONDARY BATTERY USING THE SAME, AND METHOD FOR MANUFACTURING NEGATIVE ELECTRODE FOR NONAQUEOUS ELECTROLYTE SECONDARY BATTERY

This application is the National Phase of PCT/JP2009/071024, filed Dec. 17, 2009, which claims priority to Japanese Application No. 2008-323504, filed Dec. 19, 2008, the disclosures of which are hereby incorporated by reference in their entirety.

TECHNICAL FIELD

This exemplary embodiment relates to a nonaqueous electrolyte secondary battery, particularly a lithium ion secondary battery, and relates to a negative electrode for a secondary battery in which the decrease in charge and discharge capacity is small even if charge and discharge are repeated.

BACKGROUND ART

With the rapid expansion of markets for notebook computers, cellular phones, electric cars, and the like, secondary batteries with high energy density are required. Generally, a method using a negative electrode active material with large charge and discharge capacity is known as means for increasing the energy density of a secondary battery. Patent Literature 1 describes an example of a nonaqueous electrolyte secondary battery using lithium metasilicate ($Li_2SiO_3$) that is silicon oxide containing lithium or silicon dioxide ($SiO_2$), as a negative electrode active material with large charge and discharge capacity, and using an electrolyte solution containing ethylene carbonate, as a solution of a nonaqueous electrolyte. Here, Patent Literature 1 discloses, as means for obtaining a secondary battery with high energy density, the step of electrochemically reacting silicon oxide, such as lithium metasilicate or silicon dioxide, with lithium or a substance containing lithium to obtain a negative electrode active material comprising silicon oxide containing lithium.

On the other hand, Patent Literature 2 relates to an electrode for a secondary battery in which a silicon thin film as an active material is formed on a surface of a current collector, and this silicon thin film has a configuration comprising a plurality of columnar structures. The purpose of the above configuration in Patent Literature 2 is the prevention of the occurrence of wrinkles in an electrode caused by a current collector with a silicon thin film due to repeated charge and discharge, because of a large change in the volume of the silicon thin film in the rapid charge and discharge of a secondary battery. In Patent Literature 2, by forming the shape of the above silicon thin film in such a manner that a plurality of columnar structures are arrayed, the change in the volume of the silicon thin film caused by charge and discharge is absorbed by the voids among these plurality of columnar structures, thereby preventing the deformation of the silicon thin film.

In the electrode for a secondary battery, comprising this silicon thin film, a pattern is formed on a surface of a copper foil or the like that is a current collector by a method, such as printing an ink, and after a silicon thin film is formed on the surface by sputtering or the like, the above pattern is removed by a method, such as immersing in an alkali solution. By this method, the silicon thin film according to the shape of the above pattern is formed on the current collector. By making the shape of this pattern a circular perforated pattern or the like, it is possible to form a silicon thin film comprising a plurality of columnar structures on a surface of a current collector.

CITATION LIST

Patent Literature

Patent Literature 1: JP6-325765A
Patent Literature 2: JP2003-303586A

SUMMARY OF INVENTION

Technical Problem

Generally, as the surface area of the negative electrode active material increases, the adsorption amount of lithium ions in a negative electrode for a nonaqueous electrolyte secondary battery increases and therefore, the energy density of a secondary battery using it is also improved. Therefore, in a nonaqueous electrolyte secondary battery, a negative electrode is preferably formed using a negative electrode active material, such as lithium-containing silicon oxide in the form of particles.

However, it is known that in a nonaqueous electrolyte secondary battery using such lithium-containing silicon oxide particles as a negative electrode active material, the fluctuation in the volume of the negative electrode active material accompanying the charge and discharge of the battery is large. A problem has been that when the battery in Patent Literature 1 is repeatedly charged and discharged, the particles of the negative electrode active material repeatedly expand and shrink, and the constituent particles of the negative electrode active material are broken by stress strain occurring in the particles at this time, and the pulverization of the particles proceeds. When the pulverization of the negative electrode active material proceeds, the charge and discharge capacity of the battery decreases largely, resulting in a decrease in the cycle characteristics of the nonaqueous electrolyte secondary battery.

On the other hand, it is considered that when the electrode for a secondary battery described in Patent Literature 2 is used as a negative electrode for a nonaqueous electrolyte secondary battery, the problem of the decrease in cycle characteristics due to the repetition of the charge and discharge of the battery does not occur due to the surface structure of the silicon thin film in which the plurality of columnar structures are formed. But, in this case, the energy density of the nonaqueous electrolyte secondary battery cannot be increased because the surface area of the silicon thin film forming the negative electrode is small.

In addition, it is considered that in a case where particles of a negative electrode active material are used as in Patent Literature 1, if it is possible to form a region having a plurality of columnar structures on the surface of the negative electrode active material as in Patent Literature 2, this will be effective in inhibiting a decrease in the charge and discharge capacity of the battery. However, the method using pattern printing and the sputtering of the negative electrode active material in combination, described in Patent Literature 2, is specialized in the case of the control of the shape of a surface when a thin film is used as an electrode. Therefore, even if this method is applied to the control of the shape of the surfaces of particles of a negative electrode active material, columnar structures as in the case of a thin film could not be formed because of a difference in surface shape between particles and a thin film, and the like.

This exemplary embodiment proposes particles of a negative electrode active material having such a surface structure that can relieve stress strain caused by fluctuation in volume accompanying the charge and discharge of a battery, and also proposes a method for forming the surface structures of such particles. Thus, by using the particles, a negative electrode for a nonaqueous electrolyte secondary battery in which the energy density is high, and moreover, the decrease in charge and discharge capacity is small even if charge and discharge are repeated is provided. In addition, a nonaqueous electrolyte secondary battery using the same, and a method for manufacturing such a negative electrode for a nonaqueous electrolyte secondary battery are also provided.

Solution to Problem

The present inventors have diligently made an effort, and as a result, found that lithium-containing silicon oxide particles each having a structure comprising a plurality of protrusions on a surface thereof can be fabricated as a negative electrode active material used for a negative electrode for a nonaqueous electrolyte secondary battery by the following method. First, silicon oxide particles are used as a starting raw material of the negative electrode active material. Here, silicon oxide particles are particles of an oxide of silicon typified by silicon monoxide (SiO). A case where the oxidation amount of silicon (the molar ratio of O contained) is 1 in silicon oxide is SiO, but the molar ratio of O in the silicon oxide used as the starting raw material in this exemplary embodiment is not limited to the case of 1.

Here, the molar ratio of O in the silicon oxide particles used is preferably small in a range in which the formation of the silicon oxide particles is not hindered. This is because when the molar ratio of O increases, the amount of Li trapped in oxygen in doping of Li in a subsequent step increases, and thus, the amount of Li contributing to charge and discharge reactions decreases. The preferred range of the molar ratio of O when the ease of sample synthesis is considered is between 0.8 and 1.0. Here, it has become clear that when O is less than 0.8, the fabrication of stable silicon oxide particles that are a starting raw material in this exemplary embodiment is difficult.

Silicon oxide particles are considered to be microscopically a mixture of microcrystals of both elemental silicon (Si) and silicon dioxide ($SiO_2$), and the difference in the oxidation amount of silicon can be taken as the difference in the ratio of microcrystals of both Si and $SiO_2$. A case where the oxidation amount of silicon is large is considered to be a case where the proportion of $SiO_2$ microcrystals is relatively large.

The present inventors have found that by fabricating such silicon oxide particles and heating them to a temperature range of preferably 850° C. to 1050° C., the aggregation of elemental silicon (Si) can be caused on the surfaces of the silicon oxide particles. Here, the aggregated Si is deposited as microcrystals with a diametral dimension of 0.5 nm to 3 nm on the surfaces and in the interiors of the silicon oxide particles. When the silicon oxide particles on which the microcrystals are deposited are doped with lithium (Li) and dedoped by electrochemical means, the microcrystals deposited on the particle surfaces, among the deposited Si microcrystals, react with Li to form an amorphous lithium silicon (Li—Si) alloy. Here, when doping of lithium is further performed, phase transition from the amorphous lithium silicon alloy to $Li_7Si_2$ crystals finally occurs. The formation of $Li_7Si_2$ crystals due to this phase transition can be confirmed by carrying out the X-ray diffraction of the silicon oxide particles.

Here, the volume of the $Li_7Si_2$ crystals formed by the above phase transition is much larger than that of the original Si when the number of moles of Si is the same. Therefore, as a result of this change in volume due to the phase transition, cracks occur on the entire particle surfaces, starting from the $Li_7Si_2$ crystal regions (domains) formed on the surfaces of the silicon oxide particles. Then, by performing dedoping a part of the doping Li, the cracks can be grown in the direction of the center of the silicon oxide particles, and thus, protrusions are formed on the surfaces of the particles. The shape of the protrusions is a shape, such as a columnar shape or a truncated cone. Silicon oxide particles (lithium-containing silicon oxide particles) which finally contain lithium and in which a structure comprising a plurality of protrusions is formed on the surface are obtained by the above method. This structure comprising protrusions produced on the surfaces of the lithium-containing silicon oxide particles can be confirmed by a method, such as observing the particle surfaces by a scanning electron microscope.

By the above method, in the above lithium-containing silicon oxide particles in which a structure comprising a plurality of protrusions is formed on the surface, even if charge and discharge are repeated, the change in volume accompanying the repetition is relieved by the structure comprising protrusions formed on the surfaces. Specifically, the increase in the volume of the particles in charge is absorbed by the space among the plurality of protrusions, and therefore, the apparent increase in the volume of the particles themselves is small. Thus, even if the charge and discharge of the secondary battery are repeated, the fracture of the particles is suppressed, and the pulverization of the particles hardly proceeds. Therefore, the effect that the decrease in the capacity of the secondary battery accompanying the repetition of charge and discharge becomes smaller can be obtained.

The preferred range of the temperature of the heating of the silicon oxide particles that is the first step for forming this structure comprising protrusions on the surfaces of the silicon oxide particles is determined by the following reason. First, when the heating temperature of silicon oxide is lower than 850° C., Si microcrystals are hardly deposited, and even when Si microcrystals are deposited, their diametral dimension is 0.5 nm or less. Therefore, in this case, the structure comprising protrusions can be hardly formed on the surfaces of the silicon oxide particles. On the other hand, when this heating temperature is higher than 1050° C., the deposited Si crystals grow with a diametral dimension of more than 3 nm. In this case, the Si crystals are too large, and therefore, fissures that are large and moreover rough for the silicon oxide particles occur due to doping of lithium. Thus, cracks occur in the silicon oxide particles, and their fracture proceeds. Therefore, the decrease in the capacity of the secondary battery due to the repetition of charge and discharge is large.

In addition, the atmosphere in heating the silicon oxide particles is preferably an inert atmosphere comprising Ar (argon) or a nitrogen atmosphere. But, it has been seen that there is no particular hindrance, even if the atmosphere is a vacuum, and the deposition of good Si microcrystals is obtained even in the air. In the above heating temperature range, the deposition of Si microcrystals starts in about 15 minutes of heating time. The diametral dimension of the microcrystals depends on heating time, and therefore, it is preferred to adjust heating time according to heating temperature so that the diametral dimension of the obtained microcrystals is in the range of 0.5 nm to 3 nm.

Here, the average value of the cross-sectional area at the bottom portions of a plurality of protrusions, when a structure comprising good protrusions is formed on the surfaces of the lithium-containing silicon oxide particles, is preferably in the range of 0.4 μm² to 5.4 μm². This numerical value is related to the diametral dimension of the Si microcrystals on the particle surfaces deposited due to the heating of the silicon oxide particles. According to experiments, it has become clear that when the diametral dimension is 0.5 nm, the cross-sectional area is about 0.4 μm², and when the diametral dimension is 3 nm, the cross-sectional area is about 5.4 μm².

In addition, the doping amount of Li by the electrochemical means after the heating of the silicon oxide particles is preferably in the range of 1.4 mol to 3.8 mol with respect to 1 mol of silicon in the silicon oxide particles. Here, when the doping amount of Li is less than 1.4 mol, the formation of an amorphous Li—Si alloy by the Si microcrystals deposited on the surfaces of the silicon oxide particles and Li does not proceed sufficiently, and therefore, phase transition to $Li_7Si_2$ crystals is also insufficient. Therefore, the structure comprising a plurality of protrusions is hardly formed on the surfaces of the silicon oxide particles. On the other hand, when the doping amount of Li is more than 3.8 mol, the formation of the structure comprising protrusions on the surfaces of the silicon oxide particles is promoted, and the height of the protrusions is high, and cracks may proceed even into the interiors of the particles. In this case, pulverization due to the fracture of the particles is promoted.

Further, the height of the protrusions formed on the surfaces of the lithium-containing silicon oxide particles is related to the amount of Li with which the above silicon oxide is doped. As the amount of Li for doping increases, the protrusions grow, and their height increases. In this exemplary embodiment, the average value of the height of the above protrusions is 2% to 19% of the average particle diameter of the lithium-containing silicon oxide particles. The average value of the height of the above protrusions is preferably in the range of 5% to 16% of the average particle diameter of the lithium-containing silicon oxide particles. When the average value of the height of the above protrusions is smaller than 2% of the average particle diameter, the effect of suppressing the pulverization of the particles accompanying charge and discharge is not sufficient. In addition, when the average value of the height of the above protrusions is larger than 19% of the average particle diameter, it cannot be said that the mechanical strength of the particles is sufficient. In this case, cracks occur in the particles, and so on, and it is difficult to keep their shape, and the fracture of the particles proceeds. For the average value of the height of the above protrusions, a plurality of lithium-containing silicon oxide particles are cut by a focused ion beam, their cross sections are observed by a scanning electron microscope, and the height of the protrusion cross sections is measured. The average value of the height of the above protrusions is represented by the average value of the measured values. In addition, for the average particle diameter of the lithium-containing silicon oxide particles, similarly, a plurality of lithium-containing silicon oxide particles are cut by a focused ion beam, their cross sections are observed by a scanning electron microscope, and the diameter of the particle cross sections is measured. The average particle diameter of the lithium-containing silicon oxide particles is represented by the average value of the measured values.

On the other hand, the molar ratio of O to Si, which is the oxidation amount of Si, in the silicon oxide particles that are a starting raw material, is not particularly limited, but the molar ratio of O is preferably small in a range in which the formation of the silicon oxide particles is not hindered. This is because when the molar ratio of O increases, the amount of Li trapped in oxygen in doping of Li increases, and thus, the amount of Li contributing to charge and discharge reactions decreases. When the ease of sample synthesis is considered, the preferred range is a range in which the molar ratio of O is 0.8 to 1.0. It has become clear that when O is less than 0.8, it is difficult to fabricate stable silicon oxide particles.

Further, the average particle diameter of the silicon oxide particles that are a starting raw material is not particularly limited, but for the preferred range, the average particle diameter is between 5 μm and 30 μm. The cross-sectional area of the protrusions formed on the surfaces of the lithium-containing silicon oxide particles (the average value of the cross-sectional area at the bottom portions of the plurality of protrusions) is determined by their manufacturing method and does not particularly depend on the particle diameter of the silicon oxide particles. Here, when the average particle diameter of the particles is smaller than 5 μm, the cross-sectional area of the protrusions with respect to the particle diameter is relatively large, and therefore, the deformation of the region of the structure comprising protrusions due to charge and discharge is relatively large, and cracks may proceed even into the interiors of the particles. When cracks proceed even into the interiors of the particles in this manner, the fracture of the particles is caused, and the pulverization of the negative electrode active material may occur. On the other hand, when the particle diameter is larger than 30 μm, this time, the effect of the electrical resistance of the particles increases, and the internal resistance of the battery increases, and therefore, it is difficult to provide a good nonaqueous electrolyte secondary battery. The average particle diameter of the silicon oxide particles that are a starting raw material is represented by an average particle diameter $D_{50}$ (a particle diameter in which the weight ratio is 50% when added up from the smaller particle diameter side). In addition, the electrical resistance of the silicon oxide particles can be evaluated by measuring the volume resistivity of the particles by a four-terminal method, using a powder resistance measuring apparatus.

The columnar structures on the electrode surface in Patent Literature 2 and the structure comprising protrusions formed on the surfaces of the lithium-containing silicon compound particles in this exemplary embodiment are similar in their shape, but the thin film and the particles are totally different as the object, and the implementation method is also totally different. It is also substantially impossible to form a structure comprising a plurality of protrusions as in the invention of this application on the surfaces of particles by the method, such as mask printing, described in Patent Literature 2.

In other words, this exemplary embodiment is a negative electrode for a nonaqueous electrolyte secondary battery comprising lithium-containing silicon oxide particles, wherein the lithium-containing silicon oxide particle has a structure comprising a plurality of protrusions on a surface thereof, and an average value of height of the protrusions is 2% to 19% of an average particle diameter of the lithium-containing silicon oxide particles.

In addition, this exemplary embodiment is a negative electrode for a nonaqueous electrolyte secondary battery comprising a conductive auxiliary agent and a hinder.

Further, this exemplary embodiment is a negative electrode for a nonaqueous electrolyte secondary battery wherein the structure comprising a plurality of protrusions is formed on a surface of the lithium-containing silicon oxide particle by using silicon oxide particles as a starting raw material, subjecting the silicon oxide particles to heating treatment, and then performing doping and dedoping of lithium by electrochemical means.

Further, this exemplary embodiment is a negative electrode for a nonaqueous electrolyte secondary battery wherein an oxidation amount in the silicon oxide particles is 0.8 to 1.0 with respect to one silicon atom.

Further, this exemplary embodiment is a negative electrode for a nonaqueous electrolyte secondary battery wherein heating temperature in the heating treatment is 850° C. to 1050° C.

Further, this exemplary embodiment is a negative electrode for a nonaqueous electrolyte secondary battery wherein an average value of cross-sectional area at bottom portions of the protrusions is 0.4 $\mu m^2$ to 5.4 $\mu m^2$.

Further, this exemplary embodiment is a negative electrode for a nonaqueous electrolyte secondary battery wherein a doping amount of lithium by the electrochemical means is 1.4 mol to 3.8 mol with respect to 1 mol of silicon in the silicon oxide particles.

Further, this exemplary embodiment is a negative electrode for a nonaqueous electrolyte secondary battery wherein an average particle diameter of the silicon oxide particles that are a starting raw material is 5 $\mu m$ to 30 $\mu m$.

Further, this exemplary embodiment is a negative electrode for a nonaqueous electrolyte secondary battery wherein the average value of the height of the protrusions is 5% to 16% of the average particle diameter of the lithium-containing silicon oxide particles.

Further, this exemplary embodiment is a nonaqueous electrolyte secondary battery using the negative electrode for a nonaqueous electrolyte secondary battery.

Further, this exemplary embodiment is a method for manufacturing a negative electrode for a nonaqueous electrolyte secondary battery, comprising obtaining lithium-containing silicon oxide particles each having a structure comprising a plurality of protrusions on a surface thereof by using silicon oxide particles as a starting raw material, subjecting the silicon oxide particles to heating treatment, and then performing doping and dedoping of lithium by electrochemical means, wherein an average value of height of the protrusions is 2% to 19% of an average particle diameter of the lithium-containing silicon oxide particles.

Further, this exemplary embodiment is a method for manufacturing a negative electrode for a nonaqueous electrolyte secondary battery, comprising mixing the lithium-containing silicon oxide particles, a conductive auxiliary agent, and a binder to provide a slurry, and applying the slurry on a surface of a current collector and drying the slurry.

Advantageous Effects of Invention

According to this exemplary embodiment, by forming a structure comprising protrusions on the surfaces of lithium-containing silicon oxide particles, and setting the average value of the height of the protrusions with respect to the average particle diameter of the above lithium-containing silicon oxide particles in a predetermined range, an increase and a decrease in the volume of a negative electrode active material in repeating the charge and discharge of a nonaqueous electrolyte secondary battery can be absorbed by the above particles as a change in the volume of the space between the plurality of protrusions. Therefore, it is possible to relieve an increase and a decrease in the volume of a negative electrode active material when repeating charge and discharge, and therefore, it is possible to suppress the pulverization of the lithium-containing silicon oxide particles. By using the lithium-containing silicon oxide particles according to this exemplary embodiment as the negative electrode active material, it is possible to fabricate a negative electrode for a nonaqueous electrolyte secondary battery in which when a battery is formed, its energy density is high, and the decrease in charge and discharge capacity is small even if charge and discharge are repeated.

DESCRIPTION OF EMBODIMENTS

The implementation mode of a negative electrode for a nonaqueous electrolyte secondary battery in this exemplary embodiment will be described, based on FIG. 1 to FIG. 3.

Figure 1:
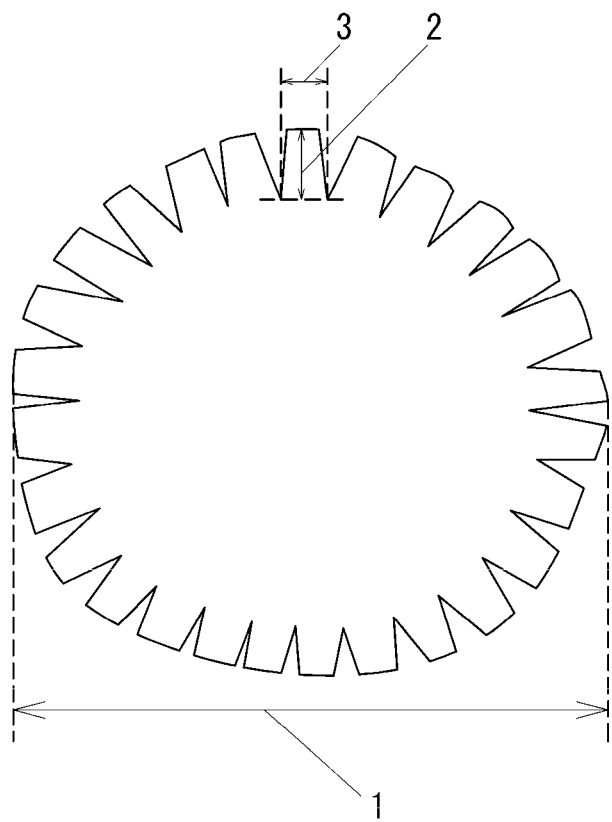
FIG. 1 is a schematic cross-sectional view of a lithium-containing silicon oxide particle in this exemplary embodiment.

FIG. 1 is a schematic cross-sectional view of a lithium-containing silicon oxide particle that is a negative electrode active material forming the negative electrode for a nonaqueous electrolyte secondary battery in this exemplary embodiment. Generally, the lithium-containing silicon oxide particle is a particle of a shape relatively close to a spherical shape as shown in FIG. 1, and a particle diameter 1 is defined as a value obtained by averaging the diametral length of the particle in any directions. A structure comprising a plurality of protrusions is formed on the surface of this lithium-containing silicon oxide particle, and the average value of the height 2 of the protrusions is in the range of 2% to 19% of the average particle diameter of the particles. The average value of the height of the above protrusions is preferably 5% to 16% of the average particle diameter of the particles. The cross-sectional area at the position of a diametral dimension 3 at the bottom portion of the protrusion is defined as the cross-sectional area of the bottom portion of the protrusion. In the negative electrode for a nonaqueous electrolyte secondary battery in this exemplary embodiment, the average value of this cross-sectional area is preferably in the range of 0.4 $\mu m^2$ to 5.4 $\mu m^2$.

The height 2 of the protrusions on the lithium-containing silicon oxide particle in FIG. 1 can be measured by the following method. First, silicon oxide particles are prepared, and Si aggregation is caused on the surfaces by heating. Then, these silicon oxide particles are mixed with a conductive auxiliary agent and a binder to provide a slurry, and the slurry is applied on a current collector and dried to provide a negative electrode for a nonaqueous electrolyte secondary battery, comprising a negative electrode active material. Further, this negative electrode is doped with Li by electrochemical means, and thus, lithium-containing silicon oxide particles are provided, and a structure comprising a plurality of protrusions is formed on their surfaces.

The fabricated negative electrode is cut by a focused ion beam, and its cross section is photographed by a scanning electron microscope to obtain an electron microscope image. In this image, a particle diameter that is the diametral diameter of a plurality of lithium-containing silicon oxide particles for which the image of the cross section is obtained, and the height of protrusions are measured, and the ratio of the two is calculated from their respective average values. For the method, specifically, one line is drawn in the electron microscope image in its diagonal direction, and based on this image, the particle diameter of each particle through which the above diagonal line passes, and the height of protrusions on each particle are measured. The particle diameter and the height of protrusions in each particle are calculated in this manner, and their respective average values are obtained. In addition, from these average values, the value of the ratio of the two (height/particle diameter) can be obtained.

Figure 2:
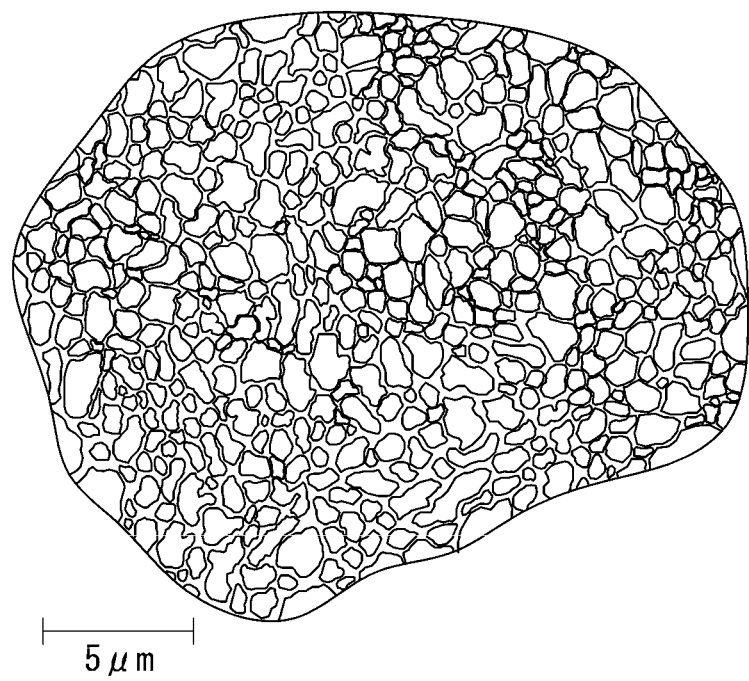
FIG. 2 is a view schematically showing the appearance of a lithium-containing silicon oxide particle when the heating temperature is 850° C., according to this exemplary embodiment.
Figure 3:
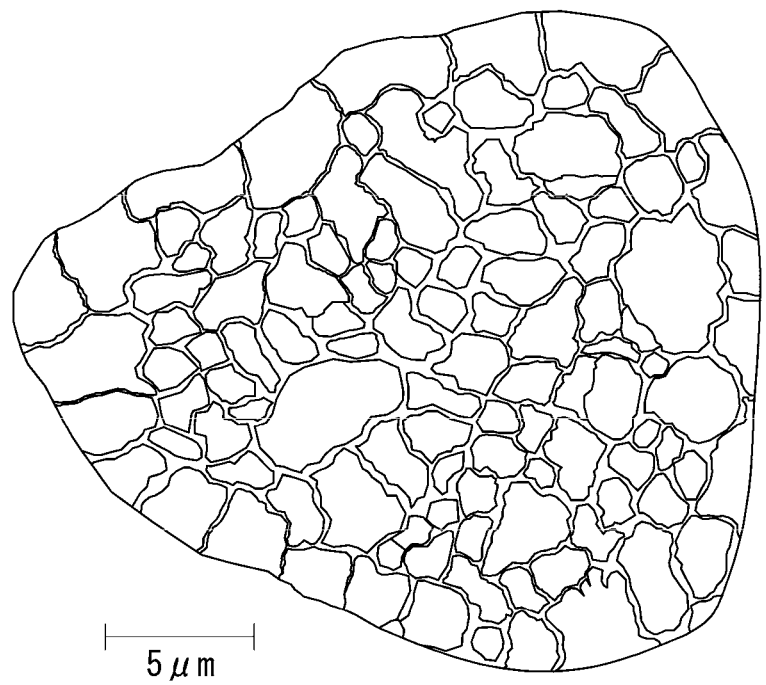
FIG. 3 is a view schematically showing the appearance of a lithium-containing silicon oxide particle when the heating temperature is 1050° C., according to this exemplary embodiment.

FIG. 2 and FIG. 3 are views each schematically showing the appearance of a lithium-containing silicon oxide particle according to this exemplary embodiment in which a structure comprising a plurality of protrusions is formed on the surface. Here, FIG. 2 is a case where the heating temperature is 850° C., and FIG. 3 is a case where the heating temperature is 1050° C. FIG. 2 and FIG. 3 are each based on an image obtained by a scanning electron microscope, and the magnification of both views is the same. In addition, the values of the average particle diameter of the silicon oxide particles used as a starting raw material in FIG. 2 and FIG. 3 are also the same and 25 μm. Here, in both of FIG. 2 and FIG. 3, a structure comprising clear protrusions is formed on the surface, but the cross-sectional area of the bottom portions of the protrusions is different between both views, and the cross-sectional area of the bottom portions of the protrusions in FIG. 2 is considerably larger. According to the study of the inventors, such a tendency has been found that as the heating temperature of silicon oxide particles increases, the cross-sectional area of the bottom portions of protrusions formed on their surfaces increases.

The average value of the cross-sectional area of the bottom portions of protrusions is calculated by the following method. First, a square region with the same area is set in an electron microscope image on the same scale, and the number of protrusions, a part or the whole of each of which is included in the region, is each counted. Next, the total number is calculated with a protrusion, the whole of which is included in the square region, as one, and a protrusion, only a part of which is included, as 0.5, and the area of the above square region is divided by this number to calculate area per columnar protrusion. This area corresponds to the average value of the cross-sectional area at the bottom portion of a protrusion per protrusion formed on the particle surface. When the average value of the cross-sectional area of the bottom portions of the protrusions in the cases of FIG. 2 and FIG. 3 is measured by this method, it is 0.90 μm² and 3.8 μm² respectively.

In order to actually fabricate a secondary battery using the negative electrode for a nonaqueous electrolyte secondary battery in this exemplary embodiment, the fabrication is preferably carried out, based on a method shown below.

(Positive Electrode Active Material)

Lithium-containing transition metal oxides are preferably used as a positive electrode active material forming the positive electrode of a nonaqueous electrolyte secondary battery. Specific examples of the lithium-containing transition metal oxides include lithium manganate with the composition $LiMnO_2$, or lithium manganate having a spinel structure with the composition $Li_xMn_2O_4$ (0<x<2), further lithium cobaltate $LiCoO_2$ and lithium nickelate $LiNiO_2$, or those in which part of these transition metals are replaced by other metals. Further, only one type of these positive electrode active materials may be used alone, but two types or more may be used in combination.

(Nonaqueous Electrolyte Solution)

The nonaqueous electrolyte solution forming a secondary battery is not particularly limited as long as it is a material that contains no moisture and is stable at the oxidation-reduction potential of metal lithium, and conventionally publicly known general nonaqueous electrolyte solutions can be used. As such nonaqueous electrolyte solutions, electrolyte solutions in which an electrolyte salt is dissolved in a nonaqueous solvent are preferred. Here, as the nonaqueous solvent, those in which two types or more among cyclic carbonates, such as propylene carbonate, ethylene carbonate, butylene carbonate, and vinylene carbonate, chain carbonates, such as dimethyl carbonate, diethyl carbonate, ethyl methyl carbonate, and dipropyl carbonate, and lactones, such as γ-butyrolactone, are mixed are preferred because of the condition of being stable at the oxidation-reduction potential of metal lithium.

In addition, the electrolyte salt forming the nonaqueous electrolyte solution serves to transport charge carriers between electrodes, and therefore, it is desired that the electrolyte salt generally has an ion conductivity in the range of $10^{-5}$ S/cm to $10^{-1}$ S/cm at 20° C. Examples of the electrolyte salt implementing this ion conductivity include lithium salts, such as $LiPF_6$, $LiAsF_6$, $LiAlCl_4$, $LiClO_4$, $LiBF_4$, $LiSbF_6$, $LiCF_3SO_3$, $LiCF_3CO_2$, $Li(CF_3SO_2)_2$, and $LiN(CF_3SO_2)_2$. Only one type of these electrolyte salts can be used, or two types or more can be mixed and used. Further, in addition to these, ionic liquids, such as quaternary ammonium-imide salts, can be used as the nonaqueous electrolyte solution of the secondary battery.

In the assembly of the nonaqueous electrolyte secondary battery, when these nonaqueous electrolyte solutions are injected into the cell of the battery, the injection may be performed at one time, or the electrolyte solution may be injected in a plurality of batches, before and after the first charge of the battery, and the like.

(Conductive Auxiliary Agent)

In forming each electrode of the positive electrode and the negative electrode, a conductive auxiliary agent may be mixed with the positive electrode and negative electrode active materials for the purpose of decreasing the impedance of the electrodes. The conductive auxiliary agent used at the time is not limited to those with particular compositions, and conventionally publicly known materials can be used. Examples of the publicly known conductive auxiliary agents that can be used include carbonaceous fine particles, such as graphite, carbon black, and acetylene black.

(Binder)

In order to strengthen the bonding properties between the constituent materials forming the positive electrode and the negative electrode, a binder may be mixed in the electrode materials. The binder that can be used is not particularly limited, and conventionally publicly known materials can be used. Examples of the publicly known binders that can be used include polyvinylidene fluoride, a vinylidene fluoride-hexafluoropropylene copolymer, a vinylidene fluoride-tetrafluoroethylene copolymer, a styrene-butadiene-copolymer rubber, polytetrafluoroethylene, polypropylene, polyethylene, polyimide, and polyamideimide.

(Current Collector)

The constituent material of a current collector forming the positive electrode and the negative electrode of the nonaqueous electrolyte secondary battery is not particularly limited either as long as it is an electrical conductor, and conventionally publicly known materials can be used. However, in terms of electrochemical stability, aluminum, nickel, copper, silver, and alloys thereof are preferably used. In addition, for the shape of the current collector, the use of a toil, a flat plate, and a mesh of these metals is preferred. Further, a thin film of aluminum, nickel, or an alloy thereof may be formed on a surface of a layer comprising the above active material formed like a plate, by a method, such as vapor deposition or sputtering, to provide an electrode integral with a current collector.

(Separator)

The constituent material of a separator located between the positive electrode and the negative electrode of the nonaqueous electrolyte secondary battery is not particularly limited either, and those conventionally publicly known can be used. Porous films and nonwoven fabrics of nonconductive resins, such as polypropylene and polyethylene, can be used as the separator.

(Shape of Battery)

The shape of the nonaqueous electrolyte secondary battery fabricated is not particularly limited either, and conventionally publicly known exterior materials can be used. Examples of the shape of the battery include a shape in which a electrode laminate comprising positive electrode and negative electrode current collectors and separators or a rolled body thereof is sealed by inserting it in a metal case or a resin case, and a shape in which the electrode laminate or the rolled body is sealed by sandwiching it between laminate films comprising a metal foil, such as an aluminum foil, and a synthetic resin film. In addition, examples of the outer shape of the battery assembled by such methods include shapes, such as a cylinder type, a prism type, a button type, a coin type, and a sheet type. In the following Examples in this exemplary embodiment, button type nonaqueous electrolyte secondary batteries are fabricated and their electrical characteristics are evaluated.

(Evaluation Method)

The method for evaluating nonaqueous electrolyte secondary batteries fabricated using the constituent elements described above is as follows. First, each of the fabricated batteries is repeatedly charged and discharged in the voltage range of 3.0 V to 4.2 V, and the retention rate of the discharge capacity of each battery is calculated. Here, the retention rate is an amount represented by C100/C1 (%), and is the ratio of discharge capacity retained also after 100 cycles of charge and discharge to initial discharge capacity. Here, C1 is discharge capacity when charge and discharge at 1 C rate (charge and discharge at a rate at which the charge and discharge of the battery are each performed in 1 hour) in the above voltage range of 3.0 V to 4.2 V are each first performed one time (1 cycle). In addition, C100 is discharge capacity after 100 cycles. Therefore, C100/C1 is the ratio (%) of the 100th discharge capacity to the first discharge capacity of the fabricated battery. As its numerical value becomes closer to 100%, the retention rate becomes higher, and therefore, it is possible to say a nonaqueous electrolyte secondary battery in which the decrease in charge and discharge capacity is small even if charge and discharge are repeated.

Here, for the negative electrode for a nonaqueous electrolyte secondary battery fabricated in this exemplary embodiment, in addition to the retention rate of the discharge capacity of the above battery, the following three types of values are further measured. The first measured value is the ratio of the average value of the height of the protrusions of the structure comprising a plurality of protrusions formed on the surfaces of the fabricated lithium-containing silicon oxide particles to the average particle diameter of the above particles. As described above, a negative electrode for measurement prepared in addition to the negative electrode for fabricating a nonaqueous electrolyte secondary battery is cut by a focused ion beam, an image of its cross section is obtained by a scanning electron microscope, and the average value of the height of the protrusions and the average particle diameter of the above particles are calculated based on the image.

In addition, the second measured value is the average value of the cross-sectional area at the bottom portion of the structure comprising a plurality of protrusions formed on the surfaces of the fabricated lithium-containing silicon oxide particles. The method for measuring it is as described above, and it is calculated by obtaining an image of the particle surface of the above negative electrode for measurement by the scanning electron microscope, and counting the number of protrusions in a fixed area, based on the image.

Further, the third measured value is the value of the volume resistivity of the powder after heating the silicon oxide particles that are a starting raw material and decreasing the temperature. This measurement is carried out using a powder resistance measuring apparatus for a four-terminal method, and measurement is performed according to JIS-K7194 "Testing method for resistivity of conductive plastics with a four-point probe array," Japanese Industrial Standards. The pressure applied during the measurement of the volume resistivity of the silicon oxide particles in the measurement is adjusted to be the same level as the pressure applied to the slurry, in which the particles are mixed, in the step of applying the slurry on a surface of the current collector to fabricate the negative electrode for a nonaqueous electrolyte secondary battery.

EXAMPLES

This exemplary embodiment will be specifically described below by Examples.

Example 1

Silicon monoxide particles with an average particle diameter $D_{50}$ of 25 μm (the oxidation amount with respect to one Si atom was 1) manufactured by Kojundo Chemical Laboratory Co., Ltd. were prepared as silicon oxide particles, and heated for 1 hour under the conditions of 950° C. in an argon atmosphere, and then, the temperature was decreased to room temperature. The volume resistivity of the silicon monoxide particles was measured by the above method. Then, carbon black as a conductive auxiliary agent, and a polyimide varnish (trade name: U-varnish-A) manufactured by Ube Industries, Ltd., as a binder, were prepared, and measured so that the weight ratio of silicon monoxide:conductive auxiliary agent: binder was the proportion of 83:2:15. Further, n-methylpyrrolidone was prepared as a solvent, and mixed with the three, the silicon oxide particles, the conductive auxiliary agent, and the binder, to provide a slurry. This mixture was applied on a surface of a copper foil with a thickness of 10 μm that was a current collector, and dried to provide a negative electrode material.

Next, a counter electrode of metal Li was prepared, and an electrolyte solution in which 1.0 mol/l of a $LiPF_6$ electrolyte salt was dissolved in a 7:3 mixed solvent of ethylene carbonate and diethyl carbonate was prepared. Further, a container was filled with the electrolyte solution, the counter electrode and the above negative electrode material were immersed there, and electric current was passed. The negative electrode material was doped with lithium ions by this electrochemical means. At this time, the doping was performed until the doping amount of lithium ions with respect to the silicon monoxide particles included in the applied material of the negative electrode material was 3.8 mol with respect to 1 mol of silicon in the silicon monoxide particles. After the completion of this doping step, part of the negative electrode was analyzed by X-ray diffraction. By this analysis, it was confirmed that a $Li_7Si_2$ crystal phase was formed on the surfaces of the silicon monoxide particles.

Then, this time, electric current was passed in the direction opposite to that during the doping, for the negative electrode material after the doping, to carry out dedoping of lithium ions to obtain a negative electrode for a nonaqueous electrolyte secondary battery. The dedoping amount at this time was 1.9 mol with respect to 1 mol of silicon in the silicon monoxide particles containing lithium in the negative electrode material, and therefore, 1.9 mol of lithium, half the doping amount, remained in the negative electrode material, with respect to 1 mol of silicon in the silicon monoxide particles. Six negative electrodes were fabricated in this manner, and these negative electrodes were observed by a scanning electron microscope. As a result, it was confirmed that in all negative electrodes, a structure comprising a plurality of protrusions was formed on the surfaces of the lithium-containing silicon oxide (silicon monoxide containing lithium) particles. The shape of the protrusions was mainly columnar. When the average value of the cross-sectional area of the bottom portions of the protrusions on the surface of one lithium-containing silicon oxide particle observed for one negative electrode among these negative electrodes was measured, the value was 1.7 µm². Further, this one negative electrode was cut by a focused ion beam, and the cut surfaces of the lithium-containing silicon oxide particles that appeared on the cross section of the negative electrode was observed by the scanning electron microscope. As a result, the value of the ratio of the height of the protrusions to the particle diameter of the lithium-containing silicon oxide particles (height/particle diameter) was 14% on average.

Further, each of the remaining five fabricated negative electrodes for nonaqueous electrolyte secondary batteries was used and combined with an electrode, as a positive electrode, obtained by applying lithium cobaltate as a positive electrode active material to an aluminum foil and drying it, to fabricate five button type batteries. Here, a polypropylene film was used for the separator forming the battery, and a 7:3 mixed solvent of ethylene carbonate and diethyl carbonate, comprising a $LiPF_6$ electrolyte salt at the ratio of 1.0 mol/l was used as the electrolyte solution. The number of the button type batteries fabricated by the above method was five, and their shapes were all an R44 type (outer diameter: 11.6 mm, thickness: 5.4 mm). For the five fabricated button type batteries, 100 Cycles of charge and discharge at 1 C rate under the above conditions were carried out, and the value of the retention rate of discharge capacity was measured. The average value of the measured amount of these five batteries was determined as the value of the retention rate of the discharge capacity of the nonaqueous electrolyte secondary batteries C100/C1 (%). The fabrication conditions of the negative electrodes for nonaqueous electrolyte secondary batteries and their measurement results in Example 1 are shown in Table 1.

Examples 2 to 5 and Comparative Examples 1 and 2

Negative electrodes for nonaqueous electrolyte secondary batteries were fabricated under the respective conditions by a method similar to that of the above Example 1, using silicon monoxide particles with an average particle diameter $D_{50}$ of 25 µm as a starting raw material. At this time, the temperature of first heating the silicon monoxide particles in an argon atmosphere for 1 hour was changed from that of Example 1 so as to be 800° C. in Comparative Example 1, 850° C. in Example 2, 900° C. in Example 3, 1000° C. in Example 4, 1050° C. in Example 5, and 1100° C. in Comparative Example 2. Therefore, together with the case of the above Example 1, Examples and Comparative Examples fabricated with the heating temperature changed every 50° C. between 800° C. and 1100° C. were obtained.

In the Examples and the Comparative Examples, the fabrication conditions of the negative electrodes and the nonaqueous electrolyte secondary batteries, other than the heating temperature, were the same as those of Example 1, and the doping amount of lithium ions with respect to silicon monoxide was 3.8 mol with respect to 1 mol of silicon in the silicon monoxide particles. The average value of the cross-sectional area of the bottom portions of the protrusions on the particle surface, and the average value of height/particle diameter were measured for the cases of these respective Examples and Comparative Examples. In addition, five button type batteries were fabricated for each conditions. Their respective measured values were averaged to obtain initial discharge capacity and discharge capacity at 100 cycles, and the value of the retention rate at 100 cycles was calculated. The fabrication conditions of each and its measurement results in Examples 2 to 5 and Comparative Examples 1 and 2 are shown in Table 1.

Examples 6 to 11

Negative electrodes for nonaqueous electrolyte secondary batteries were fabricated under the respective conditions by a method similar to that of the above Example 1, using silicon monoxide particles with an average particle diameter $D_{50}$ of 25 µm as a starting raw material. At this time, the condition of the doping amount of lithium ions with respect to silicon monoxide was changed from that of Example 1 so that the doping amount was 0.8 mol with respect to 1 mol of silicon in the silicon monoxide particles in Example 6, 1.4 mol in Example 7, 2.0 mol in Example 8, 2.6 mol in Example 9, 3.2 mol in Example 10, and 4.4 mol in Example 11. The dedoping amount after the doping of lithium ions was half of each of the above doping amounts, and therefore, the dedoping amount was 0.4 mol with respect to 1 mol of silicon in the silicon monoxide particles in Example 6, 0.7 mol in Example 7, 1.0 mol in Example 8, 1.3 mol in Example 9, 1.6 mol in Example 10, and 2.2 mol in Example 11.

Therefore, together with the case of the above Example 1, Examples fabricated with the doping amount of lithium ions with respect to 1 mol of silicon in the silicon monoxide particles changed every 0.6 mol between 0.8 mol and 4.4 mol were obtained. In the Examples, the fabrication conditions of the negative electrodes and the nonaqueous electrolyte secondary batteries, other than the doping amount and dedoping amount of lithium ions, were the same as those of Example 1, and the temperature of first heating the silicon monoxide particles in an argon atmosphere was 950° C., and the heating time was 1 hour. The average value of the cross-sectional area of the bottom portions of the protrusions on the particle surface, and the average value of height/particle diameter were measured for the cases of these respective Examples. In addition, five button type batteries were fabricated for each conditions. Their respective measured values were averaged to obtain initial discharge capacity and discharge capacity at 100 cycles, and the value of the retention rate at 100 cycles was calculated. The fabrication conditions of each and its measurement results in Examples 6 to 11 are shown in Table 1.

Examples 12 to 17 and Comparative Example 3

Negative electrodes for nonaqueous electrolyte secondary batteries were fabricated under the respective condition by a method similar to that of the above Example 1, using silicon monoxide particles as a starting raw material. At this time, the condition of the average particle diameter $D_{50}$ of the silicon monoxide that was the starting raw material was changed from that of Example 1 so that the value of the average particle diameter of the starting raw material was 3 μm in Comparative Example 3, 5 μm in Example 12, 10 μm in Example 13, 15 μm in Example 14, 20 μm in Example 15, 30 μm in Example 16, and 35 μm in Example 17. Therefore, together with the case of the above Example 1, Examples fabricated with the value of the average particle diameter $D_{50}$ of the silicon monoxide changed every 5 μm between 5 μm and 35 were obtained, except for the case of Comparative Example 3 in which the average particle diameter was 3 μm.

In the Examples and the Comparative Example, the fabrication conditions of the negative electrodes and the nonaqueous electrolyte secondary batteries, other than the value of the average particle diameter $D_{50}$ of the silicon monoxide particles, were the same as those of Example 1. In other words, the temperature of first heating the silicon monoxide particles in an argon atmosphere was 950° C., and the heating time was 1 hour. In addition, the doping amount of lithium ions with respect to the silicon monoxide particles was 3.8 mol with respect to 1 mol of silicon in the silicon monoxide particles. The average value of the cross-sectional area of the bottom portions of the protrusions on the particle surface, and the average value of height/particle diameter were measured for the cases of these respective Examples and Comparative Example. In addition, five button type batteries were fabricated for each conditions. Their respective measured values were averaged to obtain initial discharge capacity and discharge capacity at 100 cycles, and the value of the retention rate at 100 cycles was calculated. The fabrication conditions of each and its measurement results in Examples 12 to 17 and Comparative Example 3 are shown in Table 1.

Examples 18 to 21

Negative electrodes for nonaqueous electrolyte secondary batteries were fabricated under the respective conditions by a method similar to that of the above Example 1, using silicon oxide particles as a starting raw material. At this time, a plurality of types of particles in which the oxidation amount of the silicon oxide that was the starting raw material was changed from that of Example 1 were prepared, and the above negative electrodes were fabricated based on the particles. Here, the oxidation amount of the silicon oxide that was the starting raw material was 0.8 in Example 18, 0.9 in Example 19, 1.1 in Example 20, and 1.2 in Example 21. Example 1 corresponds to a case where the oxidation amount is 1.0. Here, it was actually difficult to fabricate silicon oxide particles with an oxidation amount smaller than that of Example 18, and a preferred sample with a low oxidation amount could not be prepared.

In the Examples, the fabrication conditions of the negative electrodes and the nonaqueous electrolyte secondary batteries, other than the oxidation amount of the silicon oxide that was the starting raw material, were the same as those of Example 1. In other words, the average particle diameter $D_{50}$ of the silicon oxide particles was 25 μm. In addition, the temperature of first heating in an argon atmosphere was 950° C., the heating time was 1 hour, and the doping amount of lithium ions with respect to the silicon oxide particles was 3.8 mol with respect to 1 mol of silicon in the silicon oxide particles. The average value of the cross-sectional area of the bottom portions of the protrusions on the particle surface, and the average value of height/particle diameter were measured for the cases of these respective Examples. In addition, five button type batteries were fabricated for each conditions. Their respective measured values were averaged to obtain initial discharge capacity and discharge capacity at 100 cycles, and the value of the retention rate at 100 cycles was calculated. The fabrication conditions of each and its measurement results in Examples 18 to 21 are shown in Table 1.

Here, in Table 1, the particle diameter $D_{50}$ (μm) is the value of the average particle diameter $D_{50}$ of the silicon monoxide particles that are a starting raw material. But, this particle diameter is almost unchanged in the subsequent steps, and therefore is also substantially the same as the particle diameter of the lithium-containing silicon oxide particles finally fanning the negative electrode. In addition, the heating temperature (° C.) is the heating temperature of the silicon monoxide particles in an argon atmosphere. Further, the Li doping amount (mol) is a doping amount when the negative electrode material is doped with lithium ions, but Li is subsequently dedoped in an amount half of each doping amount.

In addition, for the cross-sectional area range (μm²) among the evaluation results, the average value of the cross-sectional area at the bottom portions of protrusions in one negative electrode for a nonaqueous electrolyte secondary battery for observation, under each conditions, is measured, and its range is shown. In the measurement, five lithium-containing silicon oxide particles are selected in an image, and the average value of the cross-sectional area of the protrusions of each is calculated. Its minimum value and maximum value are described as the range. In addition, the height/particle diameter (%) is obtained by calculating the ratio of the average value of the height of the structure comprising protrusions to the average particle diameter of five particles found in an image of particle cross sections of the negative electrode under each conditions, and is the average value of the values of the height/particle diameter of the five particles. Further, the value of C100/C1(%) is obtained by calculating the average value of the retention rate of discharge capacity after 100 cycles, based on initial discharge capacity and discharge capacity after 100 cycles in five button type batteries fabricated under each conditions. Finally, the value of resistivity ($10^{-3}$ Ωcm) is a value obtained by measuring, by a four-terminal method, the volume resistivity of the powder after heating the silicon oxide particles that are a starting raw material and decreasing the temperature.

TABLE 1

| Sample | Heating temperature (° C.) | Li doping amount (mol) | Particle diameter $D_{50}$ (μm) | Oxidation amount | Cross-sectional area range (μm²) | Height/particle diameter (%) | C100/C1 (%) | Resistivity ($10^{-3}$ Ωcm) |
|---|---|---|---|---|---|---|---|---|
| Example 1 | 950 | 3.8 | 25 | 1.0 | 0.9-3.8 | 14 | 86.8 | 12 |
| Comparative Example 1 | 800 | 3.8 | 25 | 1.0 | No | — | 24.8 | 14 |

TABLE 1-continued

| Sample | Heating temperature (° C.) | Li doping amount (mol) | Particle diameter $D_{50}$ (μm) | Oxidation amount | Cross-sectional area range (μm²) | Height/particle diameter (%) | C100/C1 (%) | Resistivity ($10^{-3}$ Ωcm) |
|---|---|---|---|---|---|---|---|---|
| Example 2 | 850 | 3.8 | 25 | 1.0 | 0.4-2.0 | 10 | 79.1 | 13 |
| Example 3 | 900 | 3.8 | 25 | 1.0 | 1.1-3.3 | 12 | 82.7 | 12 |
| Example 4 | 1000 | 3.8 | 25 | 1.0 | 1.3-4.4 | 15 | 79.7 | 11 |
| Example 5 | 1050 | 3.8 | 25 | 1.0 | 2.0-5.4 | 16 | 76.1 | 10 |
| Comparative Example 2 | 1100 | 3.8 | 25 | 1.0 | 4.5-8.2 | 22 | 19.9 | 10 |
| Example 6 | 950 | 0.8 | 25 | 1.0 | 0.6-3.2 | 2 | 33.7 | 12 |
| Example 7 | 950 | 1.4 | 25 | 1.0 | 0.6-3.2 | 5 | 77.0 | 12 |
| Example 8 | 950 | 2.0 | 25 | 1.0 | 0.7-3.4 | 7 | 80.6 | 12 |
| Example 9 | 950 | 2.6 | 25 | 1.0 | 1.0-4.1 | 10 | 80.1 | 12 |
| Example 10 | 950 | 3.2 | 25 | 1.0 | 0.9-3.6 | 12 | 86.9 | 12 |
| Example 11 | 950 | 4.4 | 25 | 1.0 | 0.8-3.7 | 19 | 35.8 | 12 |
| Comparative Example 3 | 950 | 3.8 | 3 | 1.0 | No | — | 24.0 | 5 |
| Example 12 | 950 | 3.8 | 5 | 1.0 | 0.8-2.6 | 12 | 76.3 | 6 |
| Example 13 | 950 | 3.8 | 10 | 1.0 | 0.9-3.3 | 13 | 81.1 | 8 |
| Example 14 | 950 | 3.8 | 15 | 1.0 | 1.0-3.5 | 14 | 84.1 | 9 |
| Example 15 | 950 | 3.8 | 20 | 1.0 | 0.8-3.6 | 15 | 85.1 | 11 |
| Example 16 | 950 | 3.8 | 30 | 1.0 | 1.1-4.0 | 14 | 78.6 | 16 |
| Example 17 | 950 | 3.8 | 35 | 1.0 | 1.2-4.3 | 15 | 72.3 | 24 |
| Example 18 | 950 | 3.8 | 25 | 0.8 | 1.0-3.7 | 15 | 90.1 | 8 |
| Example 19 | 950 | 3.8 | 25 | 0.9 | 1.2-4.0 | 14 | 88.9 | 10 |
| Example 20 | 950 | 3.8 | 25 | 1.1 | 0.9-3.8 | 14 | 84.0 | 15 |
| Example 21 | 950 | 3.8 | 25 | 1.2 | 0.9-3.8 | 14 | 78.2 | 18 |

In Table 1, in the cases of the conditions of Comparative Examples 1 and 3, no noticeable structure comprising a plurality of protrusions was formed. Therefore "No" is described in the item of the cross-sectional area range in Table 1, and "-" is described in the item of height/particle diameter.

Here, the condition of the volume resistivity of the silicon oxide particles forming the negative electrode is a value expected as a necessary condition when a nonaqueous electrolyte secondary battery with the size is fabricated. Generally, when the volume resistivity of the constituent particles of the electrode is more than $20 \times 10^{-3}$ Ω·cm, heat generation inside the secondary battery increases, and considering the use in a safe range, the current density that can be obtained from the battery may be restricted. In addition, when the retention rate of discharge capacity is 50% or less, the reliability that is required of the secondary battery by the user may not be sufficiently satisfied.

According to Examples 1 to 5 and Comparative Examples 1 and 2 in Table 1, when the heating temperature of the silicon monoxide particles was 800° C. or 1100° C., the retention rate of discharge capacity was extremely low in either case, and a good nonaqueous electrolyte secondary battery could not be obtained. From the above, it was confirmed that the heating temperature of silicon oxide particles in making a negative electrode for a nonaqueous electrolyte secondary battery is preferably in the range of 850° C. to 1050° C. In addition, the range of the cross-sectional area at the bottom portions of the protrusions formed on the surfaces of the lithium-containing silicon oxide particles in the case of this temperature range in which the charge and discharge characteristics are good is in the range of 0.4 μm² to 5.4 μm² from the results of Examples 1 to 5 in Table 1. In other words, when the cross-sectional area of the bottom portions of the protrusions is in this range, the nonaqueous electrolyte secondary battery shows good charge and discharge characteristics in both initial discharge capacity and the retention rate of discharge capacity.

The average value of the initial discharge capacity C1 of the five nonaqueous electrolyte secondary batteries in Example 1 was 152 mAh, and the average value of discharge capacity after 100 cycles C100 was 132 mAh, though they are not described in Table 1. This initial discharge capacity is a sufficiently large value, considering the volume of the button type batteries, and it is seen that the nonaqueous electrolyte secondary batteries fabricated by the method in this exemplary embodiment have sufficiently high energy density. Also in the cases of Examples 2 to 19 in Table 1, the value of initial discharge capacity is large as in Example 1, and these batteries all have sufficiently high energy density.

In addition, according to Examples 1 and 6 to 11 in Table 1, when the doping amount of lithium ions for doping silicon monoxide particles is 0.8 mol with respect to 1 mol of silicon in the silicon monoxide particles, protrusions are formed on the particle surface, but the height of the protrusions is low. In addition, when the doping amount of lithium ions is 4.4 mol, the height of the protrusions is high on the contrary, and the value of height/particle diameter increases. In both cases, the retention rate of discharge capacity is slightly lower than that of other Examples. From the above, it was confirmed that the doping amount of lithium ions in making a negative electrode for a nonaqueous electrolyte secondary battery is preferably in the range of 1.4 mol to 3.8 mol.

Further, according to Examples 1 and 12 to 17 and Comparative Example 3 in Table 1, when the value of the average particle diameter $D_{50}$ of the silicon monoxide particles that were a starting raw material was 3 μm, the retention rate of discharge capacity was extremely low, and a good nonaqueous electrolyte secondary battery could not be obtained. In addition, when this value was 35 μm, the volume resistivity of the constituent particles of the electrode was as large as $24 \times 10^{-3}$ Ω·cm. From the above, it was confirmed that the value of the average particle diameter $D_{50}$ of silicon monoxide particles that are a starting raw material in making a negative electrode for a nonaqueous electrolyte secondary battery is preferably in the range of 5 μm to 30 μm.

Further, according to Examples 1 and 18 to 21 in Table 1, when the oxidation amount of the silicon compound particles that were a starting raw material was changed to 1.1 or 1.2, the initial discharge capacity was lower than that of other Examples. On the other hand, when the oxidation amount of the silicon compound particles was smaller than 1.0 as in Examples 18 and 19, good results were obtained in both the volume resistivity of the battery, and the retention rate of discharge capacity, but a sample having silicon compound particles with an oxidation amount of smaller than 0.8 could not be prepared. From the above, it was confirmed that the value of the oxidation amount of silicon compound particles that are a starting raw material in making a negative electrode for a nonaqueous electrolyte secondary battery is preferably in the range of 0.8 to 1.0.

As described above, by fabricating lithium-containing silicon oxide particles which each have a structure comprising a plurality of protrusions on a surface thereof and in which the average value of the height of the above protrusions is 2% to 19% of the average particle diameter of the lithium-containing silicon oxide particles, and using the lithium-containing silicon oxide particles as a negative electrode active material, it is possible to fabricate a negative electrode for a nonaqueous electrolyte secondary battery in which when a battery is formed, its energy density is high, and yet the decrease in charge and discharge capacity is small even if charge and discharge are repeated. In addition, the above description is for describing the effect of the cases according to the implementation mode in this exemplary embodiment and does not limit the invention described in the patent claims or restrict the claims. In addition, each part configuration in this exemplary embodiment is not limited to the above implementation mode, and various modifications can be made within the technical range described in the patent claims.

REFERENCE SIGNS LIST 1 particle diameter
2 height of protrusions
3 diametral dimension

The invention claimed is:

1. A negative electrode for a nonaqueous electrolyte secondary battery comprising lithium-containing silicon oxide particles of a spherical shape, wherein the lithium-containing silicon oxide particles have a structure comprising a plurality of protrusions comprising a lithium-containing silicon oxide on a surface thereof, wherein the protrusions extend outward from the surface of the lithium-containing silicon oxide particles.

2. The negative electrode for a nonaqueous electrolyte secondary battery according to claim 1, comprising a conductive auxiliary agent and a binder.

3. The negative electrode for a nonaqueous electrolyte secondary battery according to claim 1, wherein the structure comprising a plurality of protrusions is formed on a surface of the lithium-containing silicon oxide particles by using silicon oxide particles as a starting raw material, subjecting the silicon oxide particles to heating treatment, and then performing doping and dedoping of lithium by electrochemical means.

4. The negative electrode for a nonaqueous electrolyte secondary battery according to claim 3, wherein an oxidation amount in the silicon oxide particles is 0.8 to 1.0 with respect to one silicon atom.

5. The negative electrode for a nonaqueous electrolyte secondary battery according to claim 3, wherein heating temperature in the heating treatment is 850° C. to 1050° C.

6. The negative electrode for a nonaqueous electrolyte secondary battery according to claim 3, wherein an average value of cross-sectional area at bottom portions of the protrusions is 0.4 $\mu m^2$ to 5.4 $\mu m^2$.

7. The negative electrode for nonaqueous electrolyte secondary battery according to claim 3, wherein an amount of the doping of lithium by the electrochemical means is 1.4 mol to 3.8 mol with respect to 1 mol of silicon in the silicon oxide particles.

8. The negative electrode for a nonaqueous electrolyte secondary battery according to claim 3, wherein an average particle diameter of the silicon oxide particles that are a starting raw material is 5 μm to 30 μm.

9. The negative electrode for a nonaqueous electrolyte secondary battery according to claim 1, wherein an average value of height of the protrusions is 5% to 16% of the average particle diameter of the lithium-containing silicon oxide particles.

10. A nonaqueous electrolyte secondary battery using a negative electrode for a nonaqueous electrolyte secondary battery according to claim 1.

11. A method for manufacturing a negative electrode for a nonaqueous electrolyte secondary battery, comprising obtaining lithium-containing silicon oxide particles of a spherical shape each having a structure comprising a plurality of protrusions comprising a lithium-containing silicon oxide on a surface thereof by using silicon oxide particles as a starting raw material, subjecting the silicon oxide particles to heating treatment, and then performing doping and dedoping of lithium by electrochemical means, wherein an average value of height of the protrusions is 2% to 19% of an average particle diameter of the lithium-containing silicon oxide particles, and the protrusions extend outward from the surface of the lithium-containing silicon oxide particles.

12. The method for manufacturing a negative electrode for a nonaqueous electrolyte secondary battery according to claim 11, comprising mixing the lithium-containing silicon oxide particles, a conductive auxiliary agent, and a binder to provide a slurry, and applying the slurry on a surface of a current collector and drying the slurry.

13. The negative electrode for a nonaqueous electrolyte secondary battery according to claim 1, wherein the average value of height of the protrusions is 2% to 19% of the average particle diameter of the lithium-containing silicon oxide particles.

* * * * *